United States Patent [19]  
Tsukamoto et al.

[11] Patent Number: 5,010,991  
[45] Date of Patent: Apr. 30, 1991

[54] LOCK-UP CLUTCH CONTROL DEVICE FOR A TORQUE CONVERTER

[75] Inventors: Kazumasa Tsukamoto; Kazunori Ishikawa, both of Toyota; Takuji Taniguchi, Okazaki; Kunihiro Iwatsuki; Yutaka Taga, both of Aichi, all of Japan

[73] Assignees: Aisin Aw Co., Ltd.; Toyota Jidosha Kabushiki Kaisha, both of Japan

[21] Appl. No.: 407,948

[22] Filed: Sep. 14, 1989

[30] Foreign Application Priority Data

Sep. 16, 1988 [JP] Japan ................... 63-231774

[51] Int. Cl.⁵ ........................................ F16H 45/02
[52] U.S. Cl. ............................. 192/3.3; 192/3.31
[58] Field of Search ............. 192/3.3, 3.58, 3.63, 192/3.31

[56]  References Cited

U.S. PATENT DOCUMENTS

| 3,213,983 | 10/1965 | Smirl | 192/3.3 |
| 4,431,094 | 2/1984 | Parthuisot et al. | 192/3.3 |
| 4,468,988 | 9/1984 | Hiramatsu | 192/3.58 X |
| 4,582,185 | 4/1986 | Grimes et al. | 192/3.31 X |
| 4,781,279 | 11/1988 | Georg | 192/3.3 |
| 4,876,923 | 10/1989 | Crandall et al. | 192/3.3 X |
| 4,880,090 | 11/1989 | Ando | 192/3.3 |

FOREIGN PATENT DOCUMENTS 63-5625 4/1988 Japan.  
2139716A 11/1984 United Kingdom.

Primary Examiner—Rodney H. Bonck  
Attorney, Agent, or Firm—Lorusso & Loud

[57] ABSTRACT

A supplying port connecting to a supplying-side hydraulic pressure is arranged in a lock-up control valve. When the lock-up relay valve is switched ON (right half position), a supplying hyraulic pressure is supplied to a second oil chamber through an oil passage, led to a first oil chamber through an orifice and drained to a draining hydraulic oil passage through the oil passage. At this state in the lock-up control valve an inner pressure of the first oil chamber operates on a chamber through the oil passage, while an inner pressure of the second oil chamber operates on a chamber through the oil passage, and a controlling pressure from a linear solenoid valve operates on the controlling chamber. When the controlling pressure from the controlling chamber decreases by a deceleration of a vehicle speed, a valve closes a draining oil port and a drain port and increases an inner pressure of the first oil chamber. At this state when the hydraulic pressure of the second oil chamber increases by the contraction of the outer configuration of a torque convertor by a decrease of the centrifugal force, the draining oil port is connected to the supplying port and the hydraulic pressure is supplied to the first oil chamber to increase the hydraulic pressure of the chamber.

8 Claims, 6 Drawing Sheets

FIG. 6

| POSITION | | SOLENOID | | | CLUTCH | | | BRAKE | | | | ONE-WAY CLUTCH | | |
|---|---|---|---|---|---|---|---|---|---|---|---|---|---|---|
| | | 81 | 82 | 16 | $C_1$ | $C_2$ | $C_0$ | $B_1$ | $B_2$ | $B_3$ | $B_0$ | $F_1$ | $F_2$ | $F_0$ |
| P | | O(X) | X | X | X | X | O | X | X | X | X | X | X | X |
| R | | O(X) | X | X | X | O | O | X | X | O | X | X | X | O |
| R (V≥7) | | O(X) | O | X | X | X | O | X | X | O | X | X | X | O |
| N | | O(X) | X | X | X | X | O | X | X | X | X | X | X | X |
| D | 1ST | O | X | X | O | X | O | X | X | X | X | X | ⊗ | O |
| | 2ND | O | O | ◎ | O | X | O | X | O | X | X | ⊗ | X | O |
| | 3RD | X | O | ◎ | O | O | O | X | O | X | X | X | X | O |
| | 4TH | X | X | ◎ | O | O | X | X | O | X | O | X | X | X |
| 2 | 1ST | O | X | X | O | X | O | X | X | X | X | X | ⊗ | O |
| | 2ND | O | O | ◎ | O | X | O | O | O | X | X | O | X | O |
| | 3RD | X | O | ◎ | O | O | O | X | O | X | X | X | X | O |
| | (3RD) | X | X | X | O | O | O | X | O | X | X | X | X | O |
| L | 1ST | O | X | X | O | X | O | X | X | O | X | X | O | O |
| | 2ND | O | O | X | O | X | O | O | O | X | X | O | X | O |
| | (1ST) | X | X | X | O | X | O | X | X | O | X | X | O | O |
| REMARKS | O | ON | | | ENGAGE | | | | | | | LOCK | | |
| | X | OFF | | | RELEASE | | | | | | | FREE | | |
| | ◎ | ON·L·UP ON / OFF·L·UP OFF | | | | | | | | | | | | |
| | ⊗ | | | | | | | | | | | | | |

FREE AT COASTING

LOCK-UP CLUTCH CONTROL DEVICE FOR A TORQUE CONVERTER

BACKGROUND OF THE INVENTION

1. Field of the Invention

This invention relates to a fluid torque convertor which is used in an automatic transmission, in detail, relates to a control device for a torque convertor.

2. Description of the Prior Art

In general, a control device of a lock-up clutch for a torque convertor is divided by a clutch disc (plate) into two sections: the first oil chamber (clutch-off pressure) of one side and the second oil chamber (clutch-on pressure) of the other side. The clutch is connected by the oil pressure from the second oil chamber to the first oil chamber while, on the other hand, the reverse oil supply from the first to the second releases the clutch. The amount of a differential pressure of both the oil chambers is controlled by external signals such as the vehicle speed and the opening ratio of the engine throttle so that the engaging force of the clutch is controlled and regulated. Conventionally, as shown in the Japanese Patent Publication "Tokuko-Sho 63-5625", the first and the second oil chambers connect through an orifice. Furthermore controlling chambers connected to both the first and the second oil chambers are provided in the opposite position and controlled by external signals. A lock-up clutch control has a draining oil passage from the first oil chamber and a regulating valve is provided.

This lock-up control device directly senses the differential pressure by applying the inside pressure of the first and the second oil chambers to the regulating valve. Therefore the regulating valve is controlled correctly according to the external signals and can control the clutch engaging force regardless of oil temperature change.

Generally, a torque convertor whose outside casing is made of a relatively thin steel plate expands or contracts with changes in the centrifugal force and the supplying pressure, and its configuration changes. At the mentioned regulating valve (hereinafter a lock-up controlling valve) the supplying oil pressure of the first oil chamber is led to the second oil chamber through the orifice, and furthermore, as the draining oil pressure (off pressure) from the second oil chamber is regulated and controlled at the required moment, the draining oil pressure to be the origin of this control may not be able to respond to the change of the configuration of the torque convertor, because the volume of the pressure through the orifice is comparatively small. For example, when the vehicle speed decreases from a high speed condition and slipping is allowed between the transmission input and output by decreasing clutch engaging force, the draining oil pressure from the first oil chamber needs to be increased. In this state, as the volume of the torque convertor contracts based on the decrease of the centrifugal force and of the supplying pressure, the oil pressure in second oil chamber increases. Therefore torque fluctuation may not be able to be absorbed because only controlling only the amount of drainings from the first oil chamber through the orifice is not enough and because the engaging force is too strong.

At the lock-up control valve, as a governor pressure (or a throttle pressure) which is regarded as an external signal is controlled, the transient control at engaging and releasing is not enough and controlling the lock-up clutch continuously under slipping condition is difficult.

Furthermore, if the lock-up control valve sticks and the draining oil pressure (off pressure) is kept high, not only the lock-up clutch but also the torque convertor slips and overheats. At this state an oil circulation of whole the torque convertor is stopped and overheating results.

SUMMARY OF THE INVENTION

This invention is purposed to provide in a torque convertor a lock-up clutch which solves the above problems and can respond quickly and provide precise control.

This invention, which is intended to cope with the above problems, includes as shown in FIG. 1, a lock-up clutch (5) connecting the input side (2) and the output side (3) of the torque convertor (1) mechanically. A clutch plate (6) of this clutch (5) divides the first oil chamber (9) at one side from the second oil chamber (10) at the other side. A supplying hydraulic pressure (11) is supplied to the second oil chamber (10). The lock-up clutch (5) is engaged by an oil-flow-passage which drains to a predetermined oil passage (hereinafter draining oil pressure passage) (12) through the first oil chamber (9). A lock-up control valve (15) having opposing chambers (9a) and (10a) communicating, respectively, with the first oil chamber (9) and the second oil chamber (10) is provided in the draining oil passage (12). A controlling chamber (17a) which receives oil pressure from a linear solenoid valve (16) is provided in the lock-up control valve (15). The lock-up clutch control valve (15) also has a supplying port (11a), which communicates with an oil pressure port (11b) adjoining to a predetermined port (hereinafter a draining oil pressure port) and a drain port (14) are arranged. Hydraulic pressure (11b), dependent on supplying pressure at port (11), is supplied to the supplying port (11a). The lock-up control valve (15) connects the draining oil port (12a) to a drain port (14) or to a supply port (11a) at the proper time based on the control pressure from the linear solenoid valve (16).

Furthermore an oil passage (12b) for draining through an orifice (19) is connected to the draining oil passage (12).

An orifice (13) which connects the oil chambers (9) and (10) is located at the side of the inner diameter of the torque convertor (1), and provides a structure which is less influenced by the centrifugal force.

Based on the above structure when a lock-up relay valve (20) is at the "OFF" position (left-half position), hydraulic a supplying pressure (for example a secondary pressure) from the oil passage (11) is supplied to the first oil chamber (9) through the oil passage (9c), and drained from the second oil chamber (10) through the oil passage (10b) and the oil passage (21). Therefore, the lock-up clutch (5) is in a released condition. When the lock-up relay valve (20) is switched to "ON" position (at the right-half position), the hydraulic supply pressure is supplied to the second oil chamber (10) through the oil passages (11) and (10b) then to the first oil chamber (9) through the orifice (13) and finally to the oil drain passage (12) for draining hydraulic pressure through the oil passage (9c). In this state, based on the pressure differential between the oil chambers (9) and (10), the lock-up clutch (5) is engaged. The hydraulic pressure inside the first oil chamber (9) is received in the chamber (9a) of the lock-up control valve (15) through the oil passage (9b). The hydraulic pressure inside the second oil chamber (10) is received in the chamber (10a) through the oil passage (10b). So the control valve (15) receives the differential pressure directly, while the control pressure from the linear solenoid valve (16) works on the control chamber (17b). When the control pressure from the solenoid valve (hereinafter linear solenoid valve) (16) changes based on the external signals such as decelerating vehicle speed, the lock-up control valve (15) moves a spool (15a) in the direction where a draining oil port (12a) and a drain port (14) are narrowed, so that a draining volume from a draining oil passage (12) is limited and the hydraulic pressure inside the first oil chamber (9) is made higher. By this action the difference of pressure between both oil chambers (9) and (10) is made small and the engaging force of the clutch (5) is made weak. Furthermore, at this state, when the volume (2) of the torque convertor (1) is contracted by the decrease of centrifugal force and the hydraulic pressure of the second oil chamber (10) increases, the hydraulic pressure of the first oil chamber (9) through the orifice (13) can not follow the hydraulic pressure rise of the second oil chamber (10). Therefore, the control valve (15) where the hydraulic pressure of both oil chambers (9) and (10) directly works moves the spool (15a) by the pressure-difference and connects the draining oil port (12a) to the supplying port (11a). Then the hydraulic pressure at port (11b) dependent on supplied hydraulic pressure is supplied to the draining oil pressure passage (12) through the ports (11a) and (12a) and also to a first oil chamber (9) through the oil passage (9c). By this action at the control valve (15) hydraulic pressure of the first oil chamber (9) rises against hydraulic pressure of the second oil chamber (10) so that the pressure responds to the control pressure of the control chamber (17a) makes suitable pressure-difference condition.

At the start of engaging of the lock-up clutch (5) the linear solenoid valve (16) changes linearly by the electric signals from the control unit (C) and outputs a predetermined control pressure. By this action the lock-up control valve (15) can make a subtle change based on the control pressure which works on the control chamber (17a) and the draining hydraulic pressure of the draining oil passage (12) changes so that the engaging force of the clutch (5) is controlled under slipping condition.

Even if the lock-up control valve (15) sticks from steel dust, so that the draining oil port (12a) and the drain port (14) are narrowed or closed, the draining oil passage (12) is drained from the oil passage (12b) through the orifice (19) so that the oil circulation of the torque convertor (1) (11-10b-10-13-9-9c-12-12b) is maintained and the torque convertor (1) is prevented from becoming heated.

The numbers and letters which are shown in the parentheses alone refer to the drawings and do not define the invention, which is described in detail description of the preferred embodiment. And even if the numbers or letters indicate identical members, means, devices and mechanisms, there are some that have different naming from the embodiment.

BRIEF DESCRIPTION OF THE DRAWINGS

FIG. 6 is a table of operation of a solenoid valve, a clutch, a brake and a one-way clutch.

DETAILED DESCRIPTION OF THE PREFERRED EMBODIMENTS

The explanation of this invention shall be shown along with the drawings.

Figure 2:
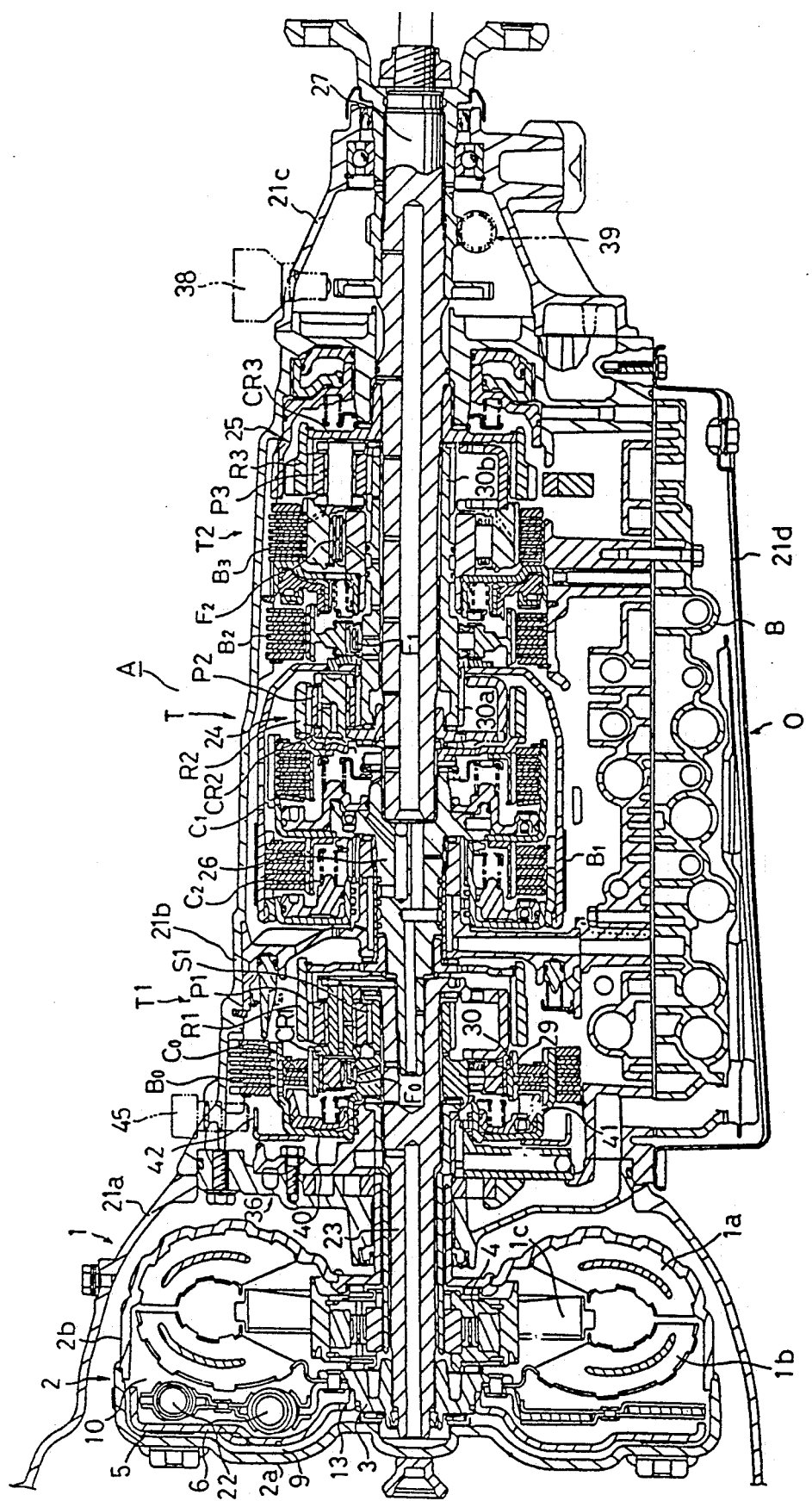
FIG. 2 is a whole cross sectional view of the automatic transmission to which this invention is applied.
Figure 3:
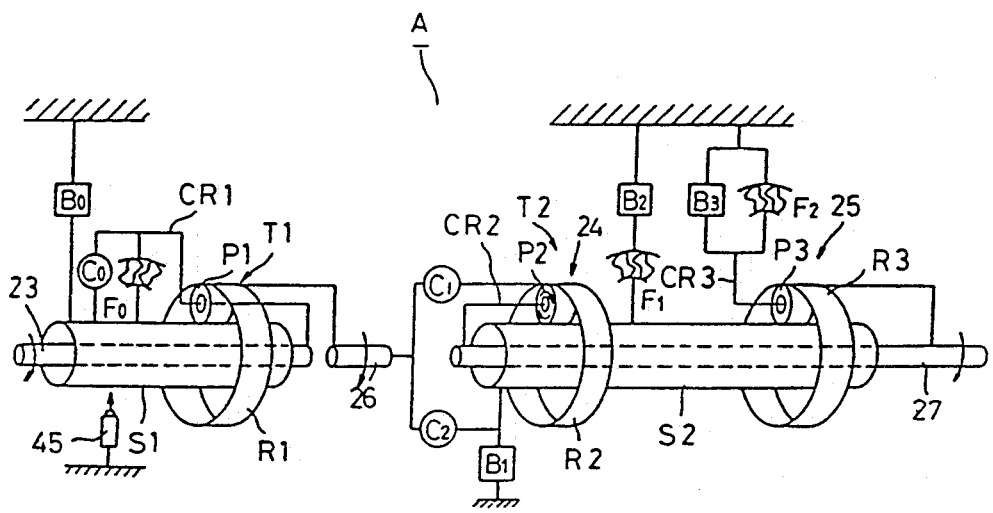
FIG. 3 is an outline view of the automatic transmission.

The automatic transmission A, as shown in FIG. 2 and FIG. 3, arranges a torque convertor 1, a planetary gear transmission T and a hydraulic pressure control device O, respectively disposed in a convertor housing 21a, a transmission case 21b an extension housing 21c and a valve body B with an oil pan 21d.

The torque convertor 1 has a convertor housing 2 composed of a front cover 2a and a case 2b. In the housing 2 a pump wheel 1a, a turbine wheel 1b connected integrally to the turbine hub 3 of the output element and a stator wheel 1c whose one-way rotation is intercepted by a one-way clutch 4 are arranged and these two wheels construct a torus. Between the torus and a front cover 2a a lock-up clutch 5 is arranged. This clutch 5 has a clutch plate 6 and a damper 22 made of two different springs. As the clutch plate 6 touches a front cover 2a, the rotation of engine crank shaft is transmitted directly to a turbine, hub 3 through a front cover 2a, the clutch plate 6 and the damper 22 and then transmitted to an input shaft 23 of the transmission gear mechanism T, spline-connected to the hub 3. Between the clutch plate 6 and a front cover 2a a first oil chamber 9 is formed and a second oil chamber 10 is formed at the back side namely the torus side. To be mentioned later on by the pressure difference of these oil chambers 9 and 10 the clutch plate 6 is engaged or released. An orifice 13 is arranged near the turbine hub 3 of the clutch plate 6 in order to let both the oil chambers 9 and 10 run through.

The transmission gear mechanism T is made of an over-drive planetary gear unit T1 and a main transmission unit T2 composed of a front planetary gear unit 24 and a rear planetary gear unit 25. The over-drive planetary gear unit T1 has a carrier CR1 which connects directly to the input shaft 23 and supports a planetary pinion P1, a sun gear S1 enclosing the input shaft 23 and a ring gear R1 which connects to an input shaft 26 of a main transmission unit T2. Between the planetary carrier CR1 and the sun gear S1 an over-drive direct clutch Co and a one-way clutch F0 are arranged. Also between the sun gear S1 and the case 21b an over-drive brake B0 is arranged. A front planetary gear unit 24 has a carrier CR2 which connects directly to the output shaft 27 and supports a planetary pinion P2, a sun gear S2 which encloses the output shaft 27 and constructed integrally with the sun gear of the rear planetary gear unit 25 and a ring gear R2 which connects to the input shaft 26 through the forward clutch C1. Between the input shaft 26 and the sun gear S2 a direct clutch C2 is arranged and between the sun gear S2 and the case 7, a 2nd coast brake B1 made of a hand brake is arranged. And a rear planetary gear unit 25 is composed of a carrier CR3 supporting the planetary pinion P3 and a ring gear R3 connecting directly to the sun gear S2 and the output shaft 27. Between the carrier CR3 and the case 21b a 1st & Rev. brake B3 and a one-way clutch F2 are arranged parallelly, "36" in FIG. 2 is an oil pump, 38 an output shaft rotating sensor, 39 a rotation measuring gear for a speed meter. As shown in FIG. 2, at an O/D planetary gear unit T1 a boss section 29 of the sun gear S1 elongates axially, while a one-way clutch F0 is arranged between the boss section and the sleeve 30 fixed by the carrier CR1, and a flange section 40 constructing a cylinder from the boss section 29a is arranged. Within this flange section 40 a piston 41 is enclosed which forms a hydraulic actuator for the clutch C0. Furthermore between the inner surface of this flange section 40 and the sleeve 30 the O/D direct clutch C0 is arranged and between the outer surface of the O/D direct clutch C0 and the case 7 the O/D brake B0 is arranged. A brim section 42 is fixed on the flange section 40 in such a way that the section 42 elongates toward outer diameter direction. A non-contact sensor 45 using light or magnetism is arranged at the case 21b facing the multiple holes or the notch section which are formed at the brim section 42. The sensor 45 senses the rotation speed of the brim section 42 integral to the input member 15 at the connection of the O/D direct clutch C0 namely the first, second and third speed.

Figure 4:
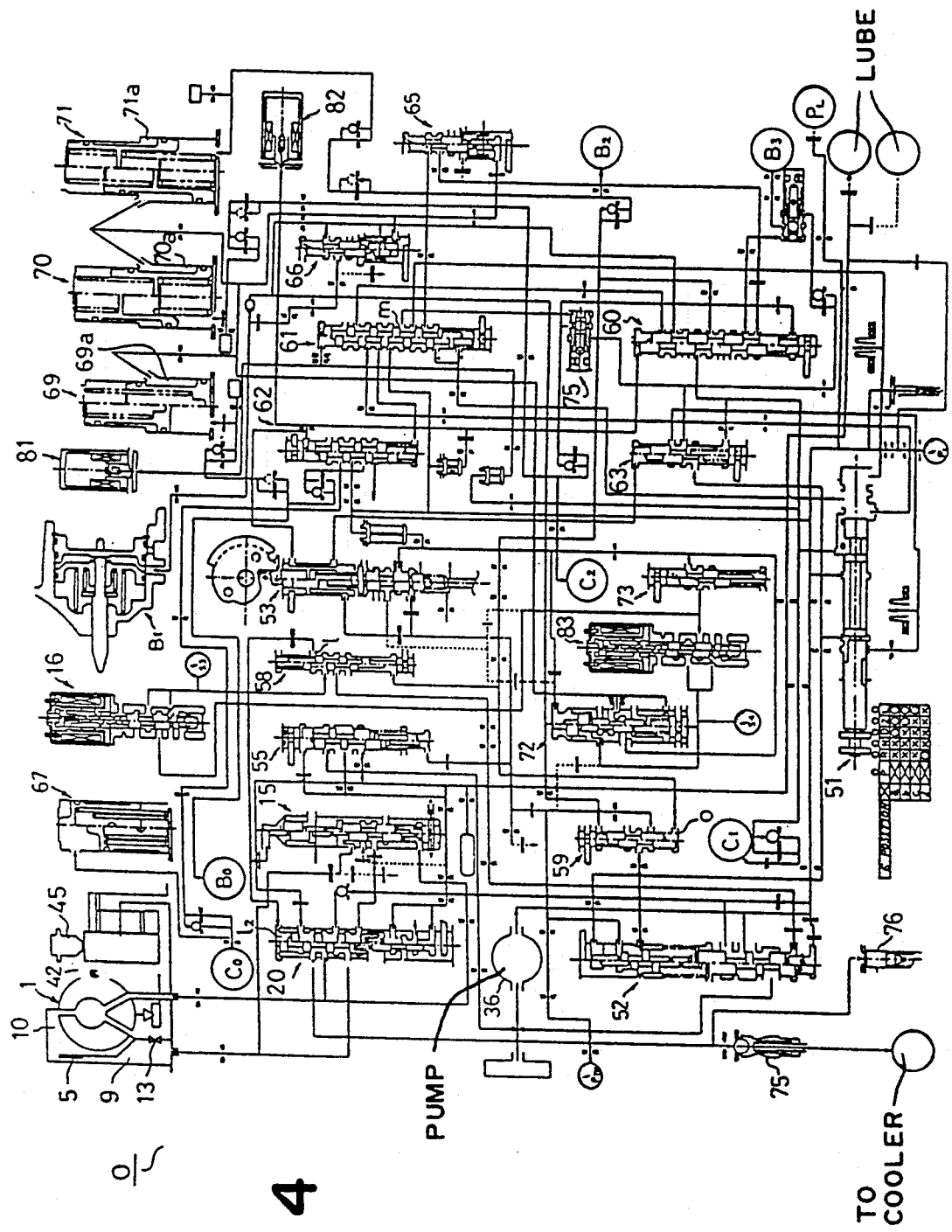
FIG. 4 is a circuit diagram showing a hydraulic pressure control device.

An oil pressure controlling device O shall be explained along with FIG. 4.

C0, C1 and C2 in the figure respectively show hydraulic servos for clutches, and B0, B1, B2 and B3 respectively show hydraulic servos for brakes. Furthermore 1 shows a torque convertor, 36 a hydraulic pump and 45 a vehicle speed sensor. And 51 shows a manual valve. At each position R, P, N, D, S and L a line pressure port P1 connects to each port a, b, c and d which are shown in the figure with circle mark "O". Furthermore 52 shows a primary regulator valve, 53 a throttle valve, 55 a secondary regulator valve and 59 a cut-back valve. 60 shows a 1-2 shift valve, 61 a 2-3 shift valve, 62 a 3-4 shift valve, 63 a reverse inhibit valve, 65 a low-coast modulator valve and 66 a second coast modulator valve. 67 shows an accumulator for C0, 69 an accumulator for B0, 70 an accumulator for C2 and 71 an accumulator for B2. 72 shows an accumulator control valve which regulates a hydraulic pressure running through back pressure chambers 69a, 70a and 71a of the accumulators 69 for B0, 70 for C2 and 71 for B2. 75 shows a cooler connecting pipe, 76 a cooler bypass valve. Furthermore 81 and 82 are the first and the second solenoid valve switching and controlling each shift valves 60, 61 and 62. 83 shows a fourth solenoid valve composed of a linear solenoid valve, which regulates the hydraulic pressure from the solenoid regulator valve 73 and supplies the regulated hydraulic pressure to the accumulator controlling valve 72. 15 shows a lock-up control valve, 20 a lock-up relay valve, 16 a third solenoid valve composed of a linear solenoid valve for the lock-up clutch control, and 58 a solenoid relay valve.

Figure 5:
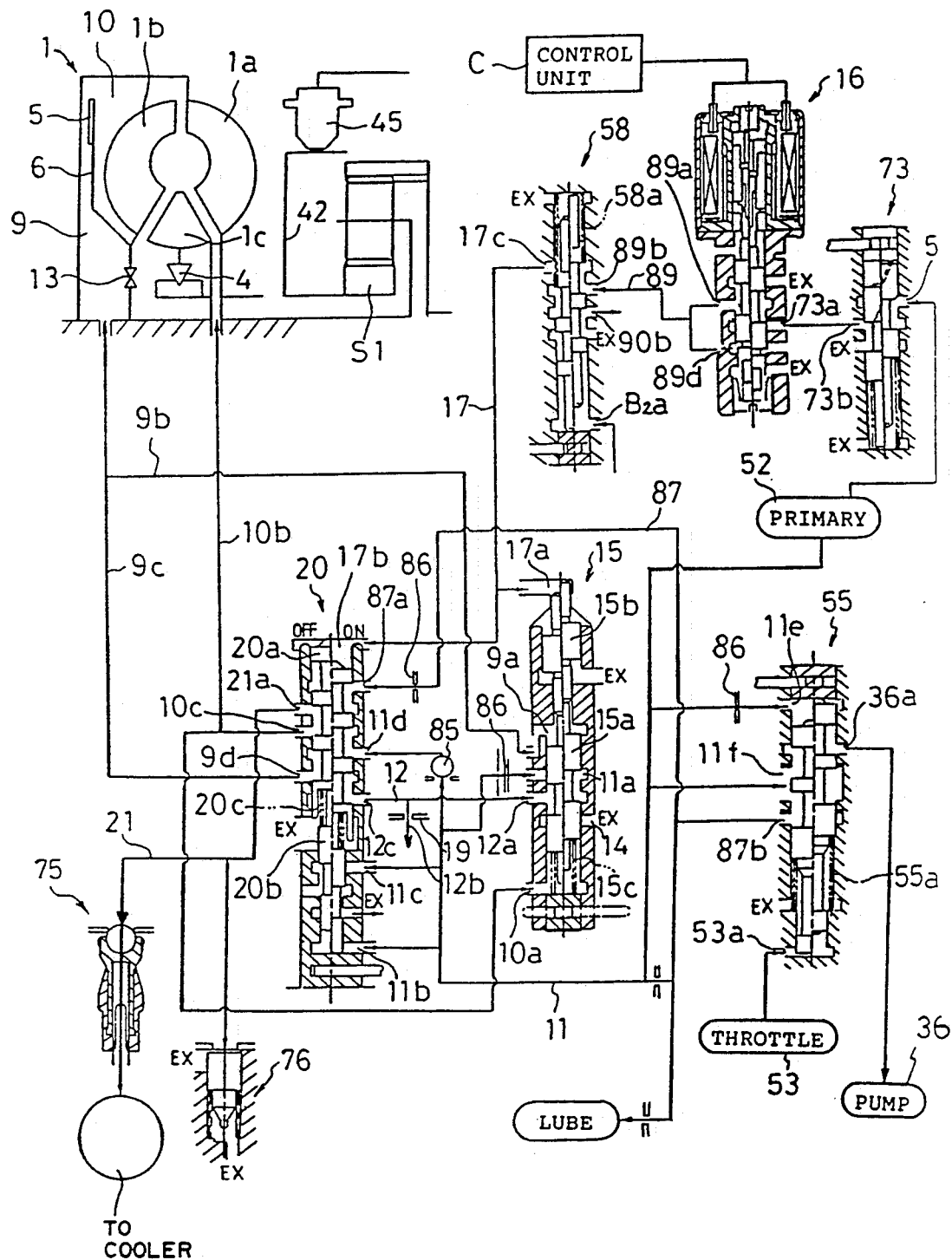
FIG. 5 is a lock-up clutch control device, which shows a different embodiment.

A lock-up clutch to be the main part of this invention shall now be explained along with FIG. 5.

The lock-up relay valve 20 has a first spool 20a and a second spool 20b. A spring 20c is arranged between both spools 20a and 20b. On the top edge of the first spool 20a a control chamber 17b where the control pressure oil passage 17 connects is arranged. On the bottom edge of the second spool 20b a first counter-oil-chamber 11b where a secondary pressure from the oil passage 11 always connects is formed, and at the middle section of the second spool where cross section areas differ from each other a second-counter-oil chamber 11c is formed. The second-counter-oil-chamber 11c is connected with the oil passage 17 when the lock-up clutch 5 is under the engaging condition, and is disconnected when the lock-up clutch 5 is under the releasing condition.

Due to the above arrangement, the lock-up relay valve 20 is given a hysteresis function which causes different counter hydraulic pressure in case between the lock-up clutch being released and engaged, and a spring 20c is disposed between the first and the second spool so that the lock-up relay valve 20 is given a fail-safe structure in case the second spool 20b is sticked.

Furthermore this valve 20 has a supplying port 11d connecting to the oil passage 11 through a check ball 85, a draining port 12c connecting to a draining hydraulic pressure oil passage 12, a port 87a connecting to a lubricating hydraulic pressure oil passage 87 from the secondary regulator valve 55 through the orifice 86, a port 9d connecting to the first oil chamber 9 of the torque convertor 1, a port 10c connecting to the second oil chamber 10, a port 21a a connecting to the oil passage 21 which is led to cooler and so on and multiple drain ports EX.

A lock-up control valve 15 has a first spool 15b and a second spool 15a, and on the top edge of the first spool 15b a control chamber 17a connecting to the control pressure oil passage 17. Furthermore, at the top edge of the second spool 15a the oil chamber 9a connecting to the first oil chamber 9 of the torque convertor 1 through the oil passage 9b. At the bottom edge of the spool 15a a spring 15c is contractedly arranged and the oil chamber 10a connecting to the second oil chamber 10 through the oil passage 10b is arranged. Furthermore at the valve 15 a draining oil port 12a connecting to the oil passage 12 for the draining hydraulic pressure 12 is arranged. Furthermore a supplying port 11a connecting to the secondary pressure oil passage 11 through the orifice 86 and a drain port 14 are arranged adjoining to the port 12a. The oil passage 12b branches off from the oil passage 12 for draining hydraulic pressure. This oil passage 12b drains through the orifice 19.

The third solenoid valve 16 composed of the linear solenoid valve has a supplying port 73a where a predetermined hydraulic pressure from the solenoid modulator valve 73 is supplied, the output port 89a, a drain port EX and a orifice port 89d. Based on a predetermined electric signal from the control unit C the hydraulic pressure from the supplying port 73a is regulated and output from the output port 89a. A solenoid modulator valve 73 has a supplying port 52a where the line pressure from the primary regulator valve 52 is supplied and a port 73b outputting the hydraulic pressure which decreases line pressure by a predetermined rate. At a solenoid relay valve 58 a spring 58a is contractedly arranged on the top of the spool. The solenoid relay valve 58 has an oil chamber B2a connecting to the hydraulic servo B2 for the second brake, the port 89b connecting to the output port 89a of the third solenoid valve 16, a port 17c connecting to the controlled pressure oil passage 17 and a port 90b (reference to FIG. 1) connecting to the pressure decreasing control chamber 90a of the primary regulator valve 52. And at the secondary regulator valve 55 a spring 55a is arranged at the bottom edge of the spool. This secondary regulator valve 55 has an oil chamber 53a where the throttle pressure from the throttle valve 53 works. A feed-back pressure oil chamber 11e is connected to the oil passage 11 for the secondary pressure through the orifice 86.

The secondary regulator valve 55 also has a port 11f connecting to an oil passage 11 for a secondary pressure, a port 87b connecting to the oil passage 87 for the lubricating hydraulic pressure and a port 36a connecting to the suction side of the pump 36.

Figure 1:
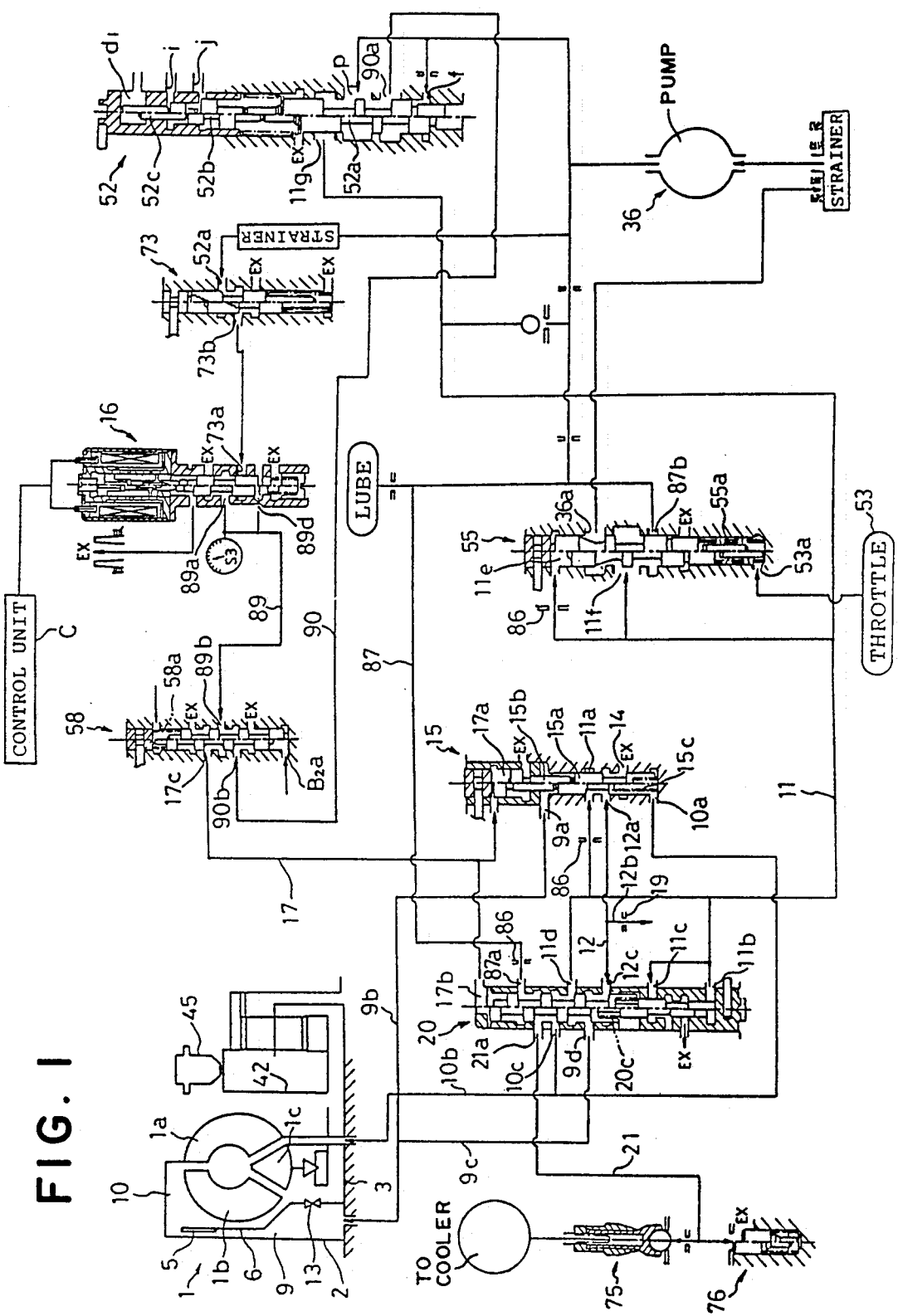
FIG. 1 is a circuit diagram of a lock-up clutch in the automatic transmission relating to this invention.

FIG. 1 is an embodiment showing partly modified the lock-up clutch control device. The valve structure of the lock-up control valve 15 partly differs such as not using a check ball 85, however, there exists no other significant differences, so that structure will be shown along with the same figures with FIG. 5 and its explanation will be abbreviated. The following explanation of the valve 52 is made with reference to FIG. 1. The valve 52 has three movable members a main spool 52a, a sub spool 52b and a plug 52c, which touch respectively and move together. At under the main spool 52a a feed back port f working on the line pressure through the orifice, a decreasing pressure control chamber port 90a, a line pressure port p, a port 11g connecting to the secondary regulator valve 55 and a drain port EX. Furthermore at the sub spool 52b a throttle pressure port i works on the top edge, a cut back pressure port j works on the shoulder section and a R-range pressure port d1 works on the top edge of the plug 52c. The line pressure port p connects to the draining side of the hydraulic pressure pump 36, regulates the pump pressure to the line pressure and can connect to each hydraulic pressure servo C0, C1, C2, B0, B1, B2, and B3. The line pressure is supplied also to the input port 52b of the solenoid modulator valve 73. As mentioned before, the decreasing pressure control chamber 90a connects to the port 90b of the solenoid relay valve 58 through the oil passage 90. The hydraulic pressure from the port 11g connects to the secondary regulator valve 55 and is regulated to the secondary pressure (convertor hydraulic pressure). And the pressure is supplied to the torque convertor 1 through the lock-up relay valve 20. The R-range pressure port d1 is connected to the port d where the line pressure is supplied when the manual valve 51 is selected to the R-range (referring to FIG. 4).

The operation of the invention will now be described in detail.

Each solenoid valve 81, 82, 16, each clutch C0, C1, C2, each brake B0, B1, B3 and each one-way clutch F0, Fl, F2, which are all in the automatic transmission 1 are controlled in each position (range) P,R, R(V=7), N, D, 2 and L as shown in FIG. 6.

Namely at first speed of D range or second range the first solenoid valve 81 is at "ON" condition, so that the over-drive direct clutch C0, the one-way clutch F0, F2 and the forward clutch C1 are engaged and the others are released. Therefore the over-drive planetary gear unit T1 is at the direct-connection condition integrally through the clutch C0 and the one-way clutch F0, while the rotation of the input shaft 23 is transmitted to the input shaft 26 of the main transmission unit T2 the rotation of the input shaft 26 is transmitted to the ring gear R2 of the front planetary gear unit 24 through the forward clutch C1, then to the carrier CR2 and the output shaft 27 which is integral to the carrier CR2. This rotation of the input shaft 26 gives the left-direction rotation to the carrier CR3 of the rear planetary gear unit 25 through the sun gear S2 and obstructed by the one-way clutch F2. The planetary pinion 3 rotates itself and the force is transmitted to the ring gear R3 which is integral with the output shaft 27.

When the manual valve 51 is selected from N range to D range, a predetermined signal is output from the control unit C to the linear solenoid valve 16 based on the signals from the position sensor. Then the hydraulic pressure from the output port 73b of the solenoid modulator valve 73 is regulated to a predetermined hydraulic pressure and supplied to the input port 89b of the solenoid relay valve 58. At the solenoid relay valve 58 the hydraulic pressure does not work on the controlling chamber B2a based on the release of the 2nd brake B2 and is at the right-half position of FIG. 1 (the left-half position of FIG. 5). Therefore the control pressure of the port 89b is supplied to the decreasing control chamber 90a of the primary regulator valve 52 through the port 90b and the oil passage 90. At this state at the primary regulator valve 52 the throttle pressure from the throttle valve 53 is supplied to the port i. As the throttle pressure works on the port j, the cut-back valve 59 brings the spool 52a to the lower position and generates the first-speed line pressure which is comparatively high. This line pressure is decreased by a predetermined measure based on the supply of the control pressure to the control chamber 90a. By this action at the manual valve 52 selecting from N to D the line pressure decreases. So the supplying pressure to the hydraulic servo C0 for the over-drive direct clutch and the hydraulic servo C1 for the forward clutch is decreased, which smoothes the start of engaging the clutches C0 and C1. And based on the signals from the control unit C, the control pressure from the linear solenoid valve 16 is slowly decreased by the timer control, so that the line pressure from the primary regulator valve 52 returns to the normal state, which ensures the engagement of the clutches C0 and C1. When the signal is sent from the control unit C after waiting for the signal from the starting sensor of the throttle sensor and the driver has no invention of starting such as stepping on the accelerating pedal, the line pressure can be kept at the hydraulic pressure by clutches Co and C1 just before the torque transmitting condition, so as to prevent creeping condition at N to D selecting.

While, at the first speed condition the solenoid relay valve 58 is at the above mentioned switching position (the right-half position of FIG. 1, the left-half position of FIG. 5) and the lock-up clutch control pressure oil passage 17 is at draining condition (the connection of the port 17c and the drain port EX). The lock-up relay valve 20 is at the left-half position of FIG. 1 (as the same with FIG. 5), and the lock-up control valve 15 is at the left-half position of FIG. 1 (the right-half position of FIG. 5. At this state the secondary (convertor) hydraulic pressure is supplied to the first oil chamber 9 of the torque convertor 1 through the port 11d, 9d of the valve 20 and the oil passage 9c, then drained to the oil passage 10b through the second oil chamber 10. Then the secondary hydraulic pressure is led to the cooler connecting 75 and the cooler bypass valve 76 through the port 10c, 21a of the relay valve 20 and the oil passage 21. Therefore the lock-up clutch 5 is at the released condition. The rotation of the engine crank shaft is transmitted to the turbine hub 3 only through the oil stream of the pump wheel 1a, the stator wheel 1c and the turbine wheel 1b and finally transmitted to the input shaft 23 of the transmission gear mechanism T. The released condition of this lock-up clutch 5 appears not only at the switching of the solenoid relay valve 58 at first speed but also at the "OFF" condition of the linear solenoid valve 16 at the second, third and fourth speed.

At the second speed of D range the second solenoid valve 82 is switched "ON" together with the first solenoid valve 81 being "ON". By this action the over-drive direct clutch C0, the one-way clutch F1 and the 2nd brake B2 are engaged and the others are released. Therefore the over drive planetary gear unit T1 is directly-connected condition and the rotation of the input shaft 23 is transmitted to the input shaft 26 of the main transmission unit T2. At the main transmission unit T2 the rotation of the input shaft 26 is transmitted to the ring gear R2 of the front gear unit 24 through the forward clutch C1 and gives the left-direction rotation to the sun gear S2 through the pinion P2. The rotation of the sun gear S2 is obstructed by the one-way clutch F1 accompanied by the engagement of the 2nd brake B2. Therefore at the planetary pinion P2 which rotates itself the carrier CR2 rotates, thus the second speed rotation is transmitted to the output shaft 27 only through the front gear unit 24.

At this state by the line pressure supply to the hydraulic servo B2 for the 2nd brake line pressure is supplied to a controlling chamber B2a of the solenoid relay valve 58. The line pressure is supplied to the control chamber B2a of the solenoid relay valve 58, which is switched to the left-half position (the right-half position of FIG. 5). Then the input port 89b connects to the output port 17c for the lock-up clutch control. At this state the control unit C receives signals from the speed, the throttle openings and the shift position and so on and gives the lock-up clutch "ON" signal to the linear solenoid valve 16. The valve 16 regulates a predetermined hydraulic pressure from the supplying port 73a and outputs the control pressure to the output port 89a. Then the control pressure is supplied to the control pressure oil passage 17 through the port 89b and 17c and works on the control chamber 17b and 17a of the lock-up relay valve 20 and the lock-up control valve 15. By this action the relay valve 20 is switched to the right-half position of FIG. 1 and FIG. 5 and the control valve 15 is switched to the right-half position of FIG. 1 (the left-half position at FIG. 5). At this state the secondary (convertor) hydraulic pressure is supplied to the second oil chamber 10 of the torque convertor through the ports 11d and 10c of the relay valve 20 and the oil passage 10b then led to the first oil chamber 9 through the orifice 13. Furthermore this pressure is drained to the draining hydraulic pressure oil passage 12 through the oil passage 9c and 12c of the port 9d of the relay valve 20, then drained from the oil passage 12b through the orifice 19, and drained through the port 12a to the drain port 14. Therefore at the lock-up clutch 5 the clutch plate 6 touches the front cover 2a based on the pressure difference between the first oil chamber 9 and the second oil chamber 10 to make a clutch engaging condition, so that the rotation of the engine crank is transmitted to the turbine hub 3 through the lock-up clutch 5.

At this state the hydraulic pressure of the first oil chamber 9 works on the oil chamber 9a formed at the top of the spool 15a of the control valve 15 through the oil passage 9b, and the hydraulic pressure in the second oil chamber 10 works on the oil chamber 10a formed at the bottom edge of the spool 15b through the oil passage 10b. Therefore, at the control valve 15 both the hydraulic pressure of the oil chamber 9 and 10 are working adversely. At this differential pressure operating condition the vehicle speed of this linear solenoid valve 16 decreases, so that when the output controlling pressure is decreased to linear by receiving the signals such as the decrease of the throttle opening, the narrowed-measure of the draining port 12a and the draining port 14 changes, which changes the differential pressure of both the oil chambers 9 and 10. Furthermore when the torque convertor housing 2 is contracted by the decrease of the centrifugal force and so on, the hydraulic pressure of the second oil chamber 10 increased by the volume change of the housing 2 works on the oil chamber 10a of the control valve 15. However, the hydraulic pressure of the first oil chamber 9 can not follow the hydraulic pressure rise of the second oil chamber 10 because of the limited oil measure through the orifice 13, so that the hydraulic pressure of the oil chamber 9a connecting to the first oil chamber 9 is comparatively low and moves the spool 15a to upper direction. Then the port 12a for the oil draining connects to the supplying port 11b and the secondary (convertor) hydraulic pressure is supplied to the supplying port 11a through the orifice 86. Furthermore the secondary (convertor) hydraulic pressure is supplied to the first oil chamber 9 through the draining oil port 12a, the draining hydraulic pressure oil passage 12, the port 12c and 9d of the relay valve 20 and the oil passage 9c. Then the hydraulic pressure of the first oil chamber 9, at the control valve 15, rises according to the hydraulic pressure of the second oil chamber 10 so as to quickly respond the control pressure of the control chamber 17a and to make a moderate pressure differential condition. By this action, as the engaging force of the lock-up clutch is weakened, slipping condition arises and the torque fluctuation can by absorbed.

At the start of engaging of the lock-up clutch 5 the electrical signals of the linear solenoid valve from the control unit C is subtly changed and the output controlling pressure changes linearly by responding to the electrical signals. Then the control valve 15 regulates the hydraulic pressure of the draining pressure oil passage 12 and engages the lock-up clutch 5 in order to prevent the shock at the engaging. Likewise at the releasing and starting of the lock-up clutch 5 the control valve 15 can release and control the lock-up clutch 5 smoothly based on the controlling pressure of the linear solenoid valve 16, so that continuous slipping control of the lock-up clutch 5 at the low-speed can be made.

Furthermore when the lock-up control valve 15 sticks the draining port 12a and the drain port 14 at the narrowing and losing condition, the draining oil passage 12 is drained from the oil passage branch 12b through the 19 and a predetermined draining volume is secured. By this action the circulating oil flow for the torque convertor 1, namely, the convertor hydraulic pressure supplying oil passage 11—the port 11d, 10c—the oil passage 10b—the second oil chamber 10—the orifice 13—the first oil chamber 9—the oil passage 9c—the port 9d, 12c—the draining hydraulic pressure oil passage 12—the branch oil passage 12 is ensured, so that the torque convertor 1 can be prevented from being heated, as the lock-up clutch 5 is heated by slipping.

The orifice 13 is placed at the inner part of the torque convertor 1 and decrease the influence of the centrifugal force caused by the rotation of torque convertor 1.

The control of the mentioned lock-up clutch is not only limited with the second speed but also at the third and the fourth speed.

At the third speed of D and second range the first solenoid 81 is switched "OFF" and the over-drive direct clutch C0, the one-way clutch F0, the forward clutch C1, the direct clutch C2 and the 2nd brake B2 are engaged, while the others are released. Therefore, the over-drive planetary gear unit T1 is directly connected.

At the main transmission unit T2 the front planetary gear unit 24 is made integral by both the clutches C1 and C2 and the rotation of the input shaft 26 is transmitted to the output shaft 27.

At the highest speed stage, the fourth speed of the D range, the second solenoid valve 82 is made "OFF" and the forward clutch C1, the direct clutch C2 and the 2nd brake B2 are engaged, while the main transmission unit T2 is directly connected as the same with at the third speed. At this state at the over-drive planetary gear unit T1 the direct clutch C0 is released and the brake B0 is engaged. Therefore, the sun gear S1 is locked by the brake B0, with the carrier CR1 rotating, and the planetary pinion P1 rotates itself to transmit power to the ring gear R1. This higher speed rotation (over-drive) is transmitted to the input shaft 26 of the main transmission unit 1b which is directly connected.

While, when operating the manual valve 51 to the second range, the condition of the first speed and the third speed are the same with that of D range. At the second speed, besides the forward clutch C1, the O/D direct clutch C0 and the 2nd brake B2, the 2nd coast brake B1 is engaged and the sun gear S2 of the main transmission unit T2 is locked, so that the engine brake can work.

The condition of the second speed of L range is as the same with that of the second speed of second range. At the first speed, besides the forward clutch C1 and the O/D direct clutch C0, the 1st & Rev. brake B3 is engaged and the carrier CR3 of the rear planetary gear unit 25 is locked, so that the engine brake can work.

At the R range the over-drive direct clutch C0, the one-way clutch F0, the direct clutch C2 and the 1st & Rev. brake B3 are engaged and the others are released. Therefore the over-drive planetary gear unit T1 is directly connected. At the main transmission unit T2, as the rotation of the input shaft 26 is transmitted directly to the sun gear S2 and the rotation of the carrier CR3 is locked by the brake B3, the rotation of the sun gear S2 is transmitted to the ring gear R3 as a reverse rotation and the out put shaft 27 is reversely rotated.

When operating the manual valve 51 at R range, the second solenoid valve 82 is being "ON" and the released condition of the direct clutch C2 does not make a reverse rotation, if the vehicle speed is above a predetermined speed, such as over 7 km/h.

TECHNICAL ADVANTAGES OF THE INVENTION

As has been explained above, the supplying port (11a) is connected to counter-oil-chamber (11b) through oil passage (11) is arranged at the lock-up control valve (15) so that the first oil chamber (9) controls not only the draining oil measure to the drain port (14) but also the supply from the supplying port (11a). Accordingly even if the outer configuration of the torque convertor (1) is deformed, the pressure condition of the first oil chamber (9) is controlled quickly against the second oil chamber (10) so that the lock-up clutch (5) is always controlled correctly at a certain engaging condition.

Furthermore if the lock-up control valve (15) is controlled by the linear solenoid valve (16), the control valve (15) is controlled linearly and precisely so that even at a transient condition engaging or releasing the differential pressure between the first oil passage (9) and the second oil passage (10) is controlled smoothly. This action prevents the occurrence of shock, and furthermore the continuous slipping control of the clutch (5) can be made so that the torque transmission is absorbed effectively.

If the draining oil passage (12b) is connected to the draining oil passage (12) through the orifice (19), the lubricating oil flow for the torque convertor (1) is secured and the over-heated condition of the torque convertor (1) can be prevented.

What is claimed is:

1. A lock up clutch control for a torque convertor, comprising:

an oil pressure supplying device, regulator valve means for providing a regulated oil pressure, a torque convertor for hydraulically transmitting engine power to an automatic transmission, a lock up clutch disposed in the torque convertor with an orifice, first and second oil chambers defined by the lock up clutch for supplying an oil fluid to release and connect the lock up clutch respectively and connected therebetween through said orifice, a lock up valve means disposed between the torque convertor and the regulator valve means for selectively supplying the regulated oil pressure to one of the first and second oil chambers and connecting the torque convertor to an exhaust port to regulate a differential pressure between inside pressures of the first and second oil chambers, and a solenoid valve means disposed between the oil supplying pressure source and the lock up valve means for regulating the differential pressure, said lock up valve means having a lock up relay valve for selectively supplying the regulated oil pressure to one of the first and second oil chambers, and a lock up control valve for connecting the torque convertor to an exhaust port to regulate the differential pressure between the inside pressures of the first and second oil chambers, said lock up relay valve including a spool, a first port connected to the first oil chamber, a second port connected to the second oil chamber, a third port connected to the regulator valve means for supplying the regulated oil pressure, and a first control chamber connected to the solenoid valve means for supplying a solenoid controlled oil pressure to selectively connect the third port to one of the first and second ports, said lock up control valve including a second spool biased by a constant pressure means, a first counter oil chamber connected to the first oil chamber, a second counter oil chamber connected to the second oil chamber, a second control chamber connected to the solenoid valve means, and a third oil chamber connected to the torque convertor for connecting the torque convertor to an exhaust port through the spool to control the differential pressure in the torque convertor, whereby said lock up control valve controls a connection between the torque convertor and the exhaust port under the condition of a differential-pressured state of the first and second oil chambers based on a solenoid controlled oil pressure.

2. A lock up clutch control device for a torque convertor according to claim 1 wherein said third oil chamber is connected to the first oil chamber for connecting the first oil chamber to the exhaust port through the spool to control pressure in the first oil chamber.

3. A lock up clutch control device for a torque convertor, comprising:
an oil pressure supplying source,
a regulator valve means for providing a regulated oil pressure,
a torque convertor for hydraulically transmitting engine power to an automatic transmission,
a lock up clutch disposed in the torque convertor,
first and second oil chambers defined by the lock up clutch for supplying an oil fluid to release and connect the lock up clutch respectively,
a lock up valve means disposed between the torque convertor and the regulator valve means for selectively supplying the regulated oil pressure to one of the first and second oil chambers and connecting the torque convertor to an exhaust port to regulate a differential pressure between inside pressures of the first and second oil chambers, and
a solenoid valve means disposed between the oil supplying pressure source and the lock up valve means for regulating the differential pressure,
said lock up valve means having
a lock up relay valve for selectively supplying the regulated oil pressure to one of the first and second oil chambers, and
a lock up control valve for connecting the torque convertor to an exhaust port to regulate the differential pressure between the inside pressures of the first and second oil chambers,
said lock up relay valve including
a spool,
a first port connected to the first oil chamber,
a second port connected to the second oil chamber,
a third port connected to the regulator valve means for supplying the regulated oil pressure, and
a first control chamber connected to the solenoid valve means for supplying a solenoid controlled oil pressure to selectively connect the third port to one of the first and second ports,
said lock up control valve including
a second spool biased by a constant pressure means,
a first counter oil chamber connected to the first oil chamber,
a second counter oil chamber connected to the second oil chamber,
a second control chamber connected to the solenoid valve means,
a supplying port connected to the regulator valve means, and
a third oil chamber connected to the torque convertor for connecting the torque convertor to an exhaust port and the supplying port through the spool to control the differential pressure in the torque convertor,
whereby said lock up control valve controls a connection among the torque convertor, the exhaust port, and the supplying port under the condition of a differential-pressured state of the first and second oil chambers based on a solenoid controlled oil pressure.

4. A lock up clutch control device for a torque convertor according to claim 3, wherein said third oil chamber is connected to the first oil chamber in the torque convertor for connecting the first oil chamber to the exhaust port and the supplying port through the spool to control the oil pressure in the first oil chamber.

5. A lock up clutch control device for a torque convertor according to claim 4, wherein said third oil chamber is connected to the first oil chamber through the lock up relay valve when the third port is connected to the second port.

6. A lock up clutch control device for a torque convertor according to claim 5, wherein the pressure of the first oil chamber is drained between the third oil chamber of the lock up control valve and the lock up relay valve.

7. A lock up clutch control device for a torque convertor according to claim 6, wherein said lock up clutch has an orifice for communication between the first and second oil chambers.

8. A lock up clutch control device for a torque convertor according to claim 7, wherein said solenoid valve means has a solenoid valve for supplying a solenoid controlled pressure to the first and second control chambers.

* * * * *